(12) United States Patent
Boyl-Davis et al.

(10) Patent No.: US 7,185,407 B2
(45) Date of Patent: Mar. 6, 2007

(54) SIDE RACK RAIL SYSTEM APPARATUS AND METHOD

(75) Inventors: Theodore M. Boyl-Davis, Snohomish, WA (US); James N. Buttrick, Jr., Seattle, WA (US); Darrell D. Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 106 days.

(21) Appl. No.: 10/854,211

(22) Filed: May 27, 2004

(65) Prior Publication Data

US 2005/0263538 A1 Dec. 1, 2005

(51) Int. Cl.
*B21D 39/03* (2006.01)

(52) U.S. Cl. .............. 29/33 R; 105/29.1; 105/144

(58) Field of Classification Search ........ 409/178–179; 105/29.1, 144; 29/33 R
See application file for complete search history.

(56) References Cited

U.S. PATENT DOCUMENTS

| | | | | | |
|---|---|---|---|---|---|
| 3,175,110 | A | * | 3/1965 | Kohlhagen | 310/83 |
| 3,226,027 | A | * | 12/1965 | Cable et al. | 238/1 |
| 3,485,306 | A | * | 12/1969 | Gulley | 173/32 |
| 3,575,364 | A | * | 4/1971 | Frederick | 266/56 |
| 4,241,664 | A | * | 12/1980 | Cable | 104/118 |
| 4,382,728 | A | * | 5/1983 | Anderson et al. | 409/137 |
| 4,422,384 | A | * | 12/1983 | Johnson et al. | 105/29.1 |
| 4,494,025 | A | * | 1/1985 | Fickler | 310/80 |
| 4,664,590 | A | * | 5/1987 | Maekawa | 414/744.1 |
| 4,703,698 | A | * | 11/1987 | Kazlauskas | 105/29.1 |
| 5,323,962 | A | * | 6/1994 | Jassby et al. | 238/10 R |
| 5,562,043 | A | * | 10/1996 | Gromes | 105/29.1 |
| 5,735,214 | A | * | 4/1998 | Tsuboi | 105/29.1 |
| 5,842,598 | A | | 12/1998 | Tsuchida | 221/258 |
| 6,098,550 | A | * | 8/2000 | Tsuboi | 105/29.1 |
| 6,158,666 | A | * | 12/2000 | Banks et al. | 238/10 R |
| 6,494,307 | B1 | * | 12/2002 | Kozak et al. | 198/465.1 |
| 6,843,328 | B2 | * | 1/2005 | Boyl-Davis et al. | 173/32 |
| 6,926,094 | B2 | * | 8/2005 | Arntson et al. | 173/32 |
| 6,966,731 | B2 | * | 11/2005 | VanderPol et al. | 409/179 |
| 2004/0265077 | A1 | * | 12/2004 | Boyl-Davis et al. | 408/1 R |
| 2004/0265081 | A1 | * | 12/2004 | Buttrick, Jr. | 408/76 |

\* cited by examiner

*Primary Examiner*—Monica Carter
*Assistant Examiner*—Eric A. Gates
(74) *Attorney, Agent, or Firm*—Baker & Hostetler LLP

(57) ABSTRACT

A rail system for positioning a toolhead above a workpiece uses a rack cut into one edge of the rail and driven by a pinion gear whose shaft is approximately perpendicular to a workpiece to couple the rail to the toolhead. Multiple rollers placed on the toolhead allow contact between the toolhead and the rail to be effectively continuous despite the cutting away of as much as or more than two-thirds of the rail edge to provide rack teeth. Separating thickness axis containment from transverse with a square rail edge and separate thickness axis and transverse rollers allows the toolhead to follow a rail as the rail flexes over a curved surface with minimal position error. Several variations in rail, bearing, and rack implementation can realize comparable results.

23 Claims, 7 Drawing Sheets

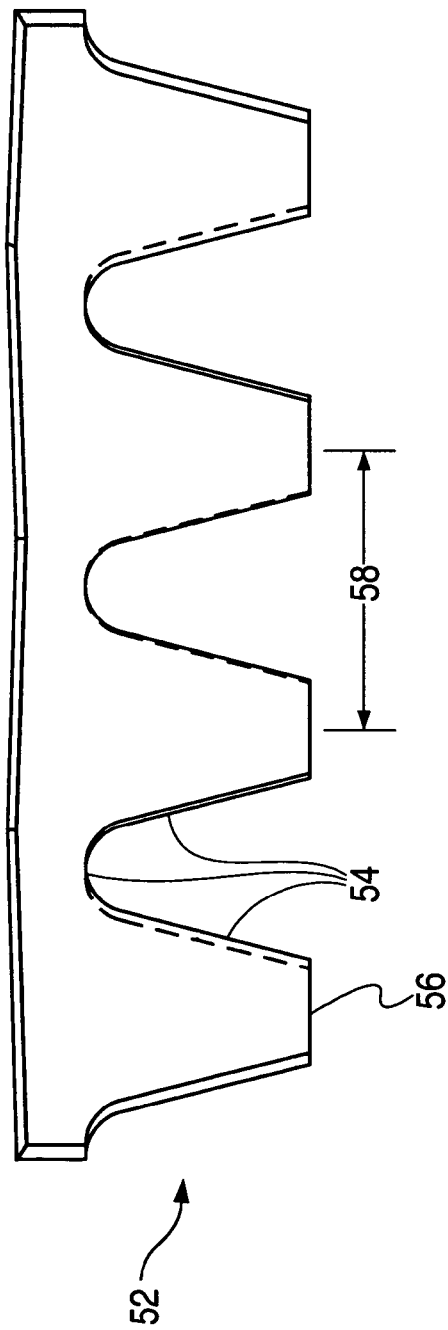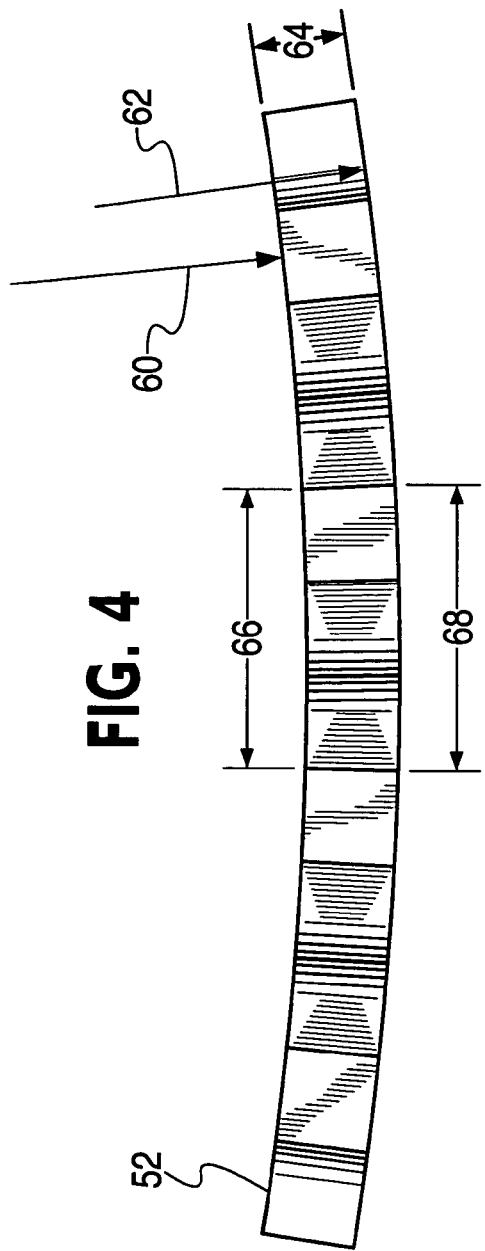

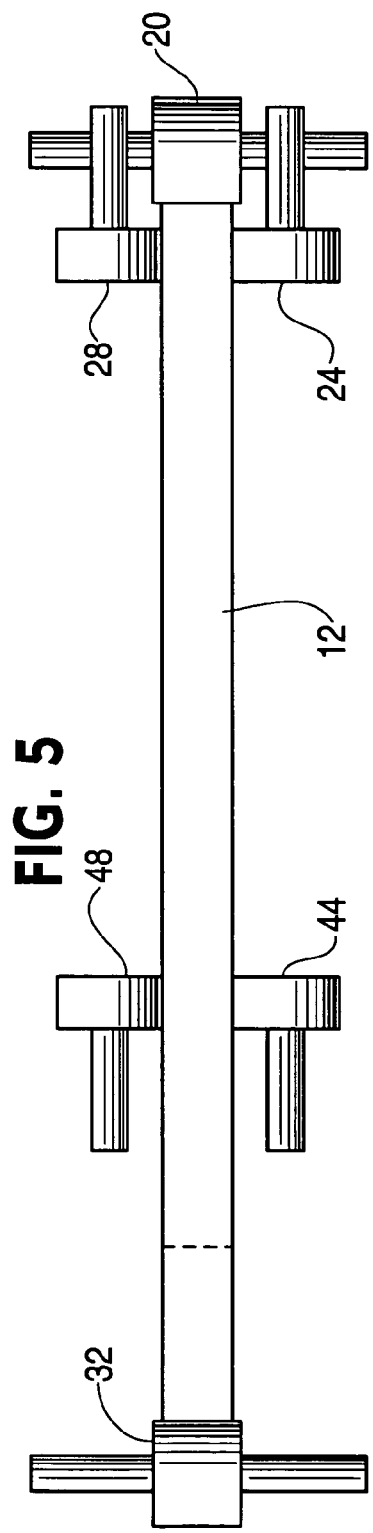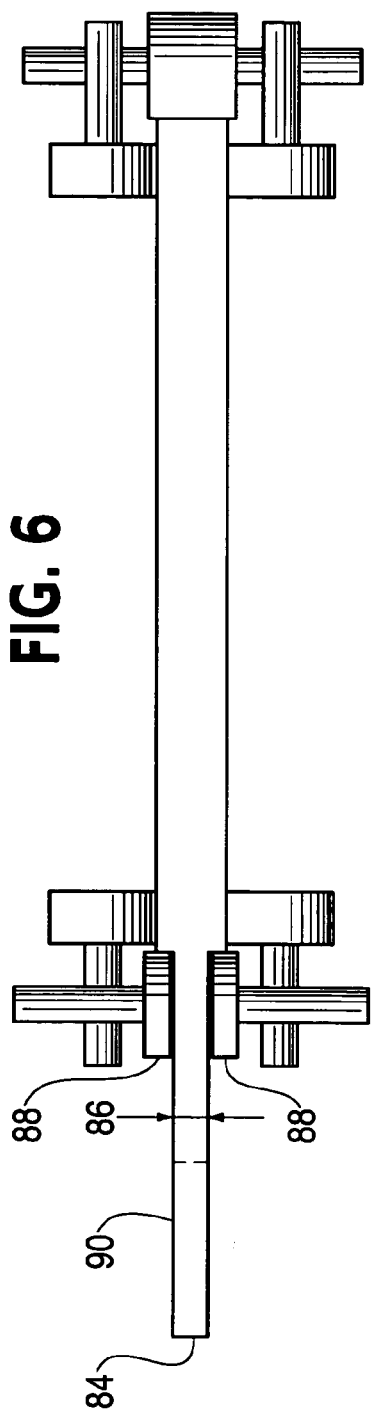

SIDE RACK RAIL SYSTEM APPARATUS AND METHOD

FIELD OF THE INVENTION

The present invention relates generally to manufacturing tools and automation. More particularly, the present invention relates to self-positioning drive coupling systems for rail-mounted machine tools.

BACKGROUND OF THE INVENTION

Demonstrable benefit can be realized by temporarily, repositionably, and nondestructively attaching power tools such as drills to workpieces such as the skins of aircraft under construction, which attachment may enhance tool operation—specifically by replacing hand operations with machine-controlled operations, to improve hole location, angle, diameter, and degree of uniformity. Attaching tools to the workpieces can be beneficial in many manufacturing arts, including, among others, manufacture of aircraft and other vehicles, and of static structures.

A typical arrangement uses a rail and a drive mechanism. The rail comprises a long strip of relatively wide and thin metal attached to many vacuum cups so that the rail can be drawn into close conformance to the shape of a workpiece, where the workpiece may be for example a relatively large piece of sheet metal or other sheet material such as carbon fiber-reinforced plastic. Such a rail sits above the workpiece and is sturdy enough to support a power-operated tool, such as a drill. The exact location of the tool on the rail and on the workpiece may be critical to the quality of the workpiece and may be measurable. In the prior art, a slideable mounting of a tool along the rail can use vee guides on the tool attachment mechanism (hereinafter toolhead), which vee toolhead guides may be for example female, and may be clamped to and free to slide along mating male vee guides that are integral with the rail. A representative complete prior art apparatus may use a pair of such rails independently vacuumed down to a surface, with one of the rails geared to a toolhead using a motorized and direct-measuring drive and the other allowing free sliding of the toolhead.

Moving a toolhead on a rail can be accomplished using positively coupled, that is, slip-free, drives, such as a motor driven pinion gear whose shaft may be parallel to a transverse axis of the rail. As the motor rotates in such prior-art devices, the pinion drives the toolhead along a rack. A transducer such as an encoder may be used to measure the position of the motor (and the toolhead) with respect to a reference point on the rail.

While successful in prior use, drive systems using the above-described rack technology have at least one significant drawback. It would be desirable that the rail remain flexible to permit both thin-axis bending and twisting, yet permit highly precise positioning of the toolhead.

Accordingly, it is desirable to provide a flexible track rail and toolhead containment system that provides robust and precisely measurable positioning of the toolhead while permitting the use of a simple rail that is relatively easy to fabricate.

SUMMARY OF THE INVENTION

The foregoing needs are met, to a great extent, by the present invention, wherein in one aspect an apparatus is provided that in some embodiments is a rail system for positioning a toolhead with respect to a workpiece using a rack cut into one edge of a rail and driven by a pinion gear to couple the rail to the toolhead.

In accordance with one embodiment of the present invention, a flexible track tool system to perform operations upon and into a surface of a workpiece that has a mean planar first surface proximal to the tool system comprises a resilient, flexible rail with generally parallel upper and lower surfaces, and with a longitudinal axis, a transverse axis, and a thickness axis, a first longitudinal rail edge generally parallel to the longitudinal axis, a second longitudinal rail edge generally parallel to the longitudinal axis, a set of standoff devices to position the rail at a substantially uniform and surface-contour-following distance above the workpiece, with the thickness axis substantially perpendicular to the first surface of the workpiece, a toolhead positioned on the rail, a set of toolhead-to-rail retention devices that permit the toolhead to translate longitudinally with respect to the rail, a gear tooth rack formed into the second longitudinal rail edge, and a drive pinion rotatably attached to the toolhead, to mesh with the gear tooth rack.

In accordance with another embodiment of the present invention, a flexible track tool system to perform operations on a surface of a workpiece that has a mean planar first surface proximal to the tool system comprises a rail, means for supporting a tool on the rail, means for continuously positioning the tool supporting means on the rail with generally parallel upper and lower positioning surfaces above a proximal workpiece surface, wherein the means for positioning has a longitudinal axis, a transverse axis, and a thickness axis, means for limiting transverse motion of a tool supporting means on a rail with a first longitudinal edge and a second longitudinal edge substantially parallel to said longitudinal axis, means for connecting the rail to the workpiece at a distributed series of locations and at a uniform distance, means for permitting longitudinal translation of the tool supporting means to substantially any position along the extent of the rail while preventing thickness axis or transverse displacement of the tool supporting means with respect to the mean planar first surface of the workpiece, and means for providing traction on the rail with respect to the tool supporting means.

In accordance with yet another embodiment of the present invention, a method for performing tool operations on a workpiece that has a mean planar first proximal surface comprises the steps of continuously positioning a toolhead above a proximal workpiece surface with a rail, wherein the rail has a longitudinal axis, a transverse axis, and a thickness axis, with generally parallel upper and lower positioning surfaces, and with a first longitudinal edge and a second longitudinal edge substantially parallel to the longitudinal axis, wherein the thickness axis is substantially perpendicular to the first surface of the workpiece, connecting the rail to the workpiece at a distributed series of locations and at a uniform distance, permitting longitudinal translation of the toolhead to substantially any position along the extent of the rail while substantially preventing thickness axis or transverse displacement of the toolhead, providing traction on the rail with respect to the toolhead with a plurality of gear teeth comprising a rack, wherein the rack teeth interrupt the second longitudinal edge of the rail, and applying longitudinal translational force from the toolhead by a pinion gear with an axis of rotation substantially perpendicular to the workpiece.

There have thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3 is a view of a rail from the workpiece in FIG. 1.

FIG. 4 is a view from the rack edge of the rail of FIG. 3.

FIG. 5 is a rail and roller section view taken through A—A from FIG. 2.

FIG. 6 is an alternate embodiment rail and roller section view akin to that of A—A from FIG. 2.

DETAILED DESCRIPTION

Figure 1:
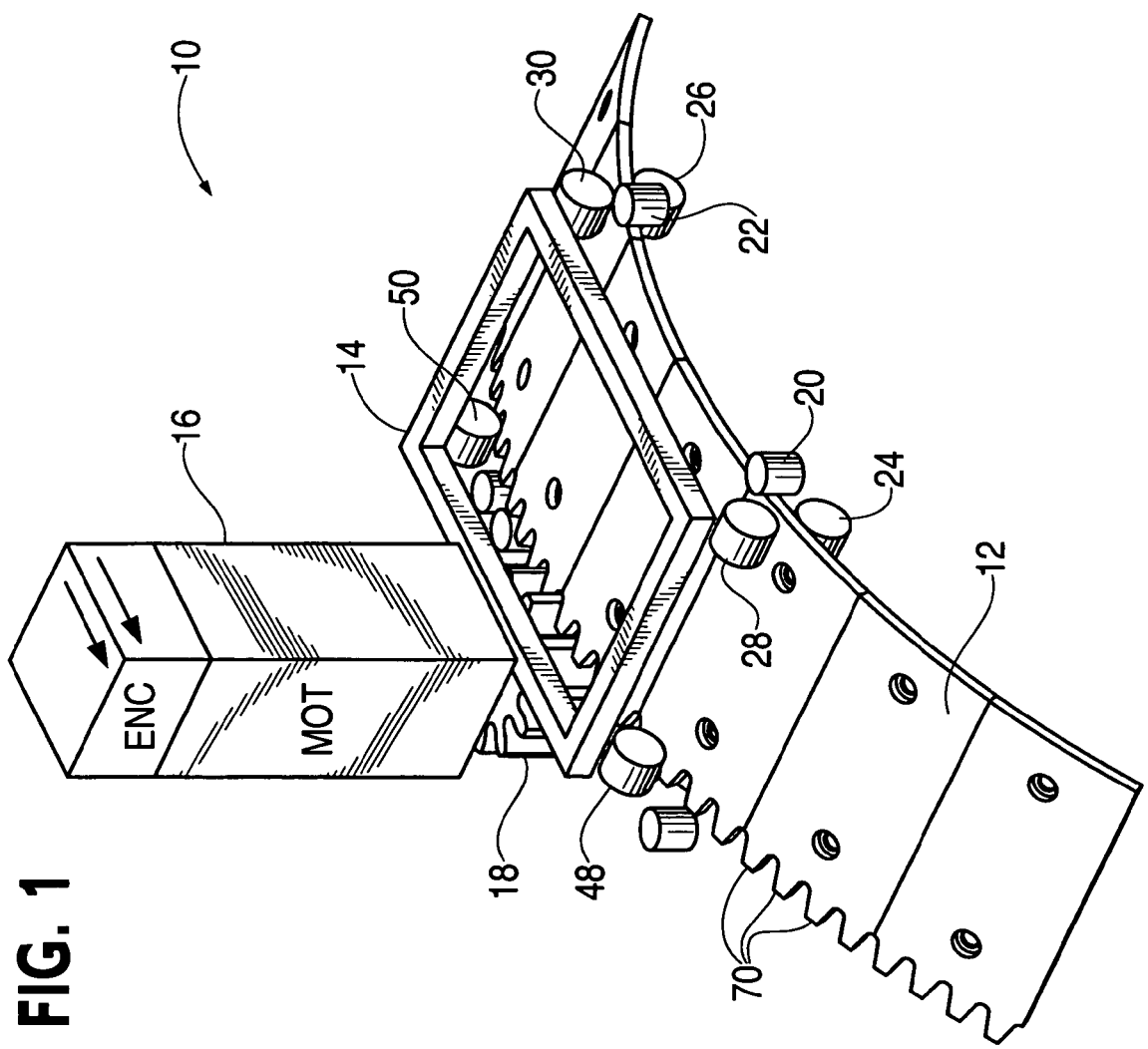
FIG. 1 is a perspective view illustrating a rail system for positioning a toolhead according to a preferred embodiment of the invention.

An embodiment in accordance with the present invention provides a rail system for positioning a toolhead above a workpiece. Smooth motion of a toolhead along a rail is achieved in the exemplary embodiment through use of square rail faces contacted by rollers on the toolhead. Motorized drive of the toolhead along the rail in the exemplary embodiment is achieved using a pinion gear on the toolhead and a rack cut into one edge of the rail. The invention will now be described with reference to the drawing figures, in which like reference numerals refer to like parts throughout.

In the preferred embodiment, each meshing tooth face of the rack and of the pinion forms an involute curve, which necessarily gives the rack teeth straight sides and nominally flat addendum and dedendum surfaces. Either the addendum or the dedendum surface between each two tooth contact faces may be left curved for manufacturing convenience, although in some cases only the dedendum surface of a rack is left filleted or curved. This commonly leaves a succession of flats at the maximum extent of the rail on the rack side. A plurality of rollers on the rack side of the toolhead can contact the flats so formed along the rack side of the rail in succession to maintain substantially constant positioning force on the rack side.

Other positioning methods are also applicable for systems that employ a comparable side rack rail. For example, a potentially useful option is to stub the rack teeth, such as by reducing the tooth height to 80% of the ideal height above the pitch line. A stub tooth rack requires a pinion with more teeth to compensate for the loss in contact area and to ensure that at least one tooth is always meshing properly. Stubbing of the rack teeth can have the effect of increasing the length of each flat that the rollers contact.

The embodiments described herein can achieve comparable toolhead stability on a rail that has mechanical properties comparable to those of previous designs while reducing the number and complexity of rail manufacturing steps.

In the discussion herein, the term "longitudinal" is used with reference to a rail to describe its greatest dimension, while "transverse" refers to the rail's width, so that the entire longitudinal and transverse dimensions of the rail generally face directly toward or away from the workpiece. The term "edge" is used to refer to a flat face of a rail perpendicular to the workpiece-side and toolhead-side faces thereof, and extending for substantially the entire length of the rail, and substantially at right angles to the workpiece-side and toolhead-side faces. The two ends of the rail are not addressed herein. Axial references herein are generally longitudinal, transverse, and thickness, as though the rail were rigid. Terms "forward" and "aft" herein are arbitrarily chosen with respect to one end of a toolhead, which is represented graphically by a simplified cart frame, with a directional arrow on the pinion drive housing as an orientation reminder. Terms "proximal" and "distal" are used instead of "left" and "right" with respect to the rack.

FIG. 1 shows a preferred embodiment of the side rack rail system. A rail system 10 has a rail 12 on which a toolhead, represented by a cart frame 14, is propelled, using, for example, a combined motor/gearbox/encoder unit 16 driving a pinion gear 18, to any desired position along the rail 12. The toolhead 14 may be constrained to a single position in the thickness axis direction or the transverse direction with respect to a distal side of the rail 12 by a forward distal transverse roller 20, an aft distal transverse roller 22, a forward distal bottom thickness axis roller 24, an aft distal bottom thickness axis roller 26, a forward distal top thickness axis roller 28, and an aft distal top thickness axis roller 30.

Figure 2:
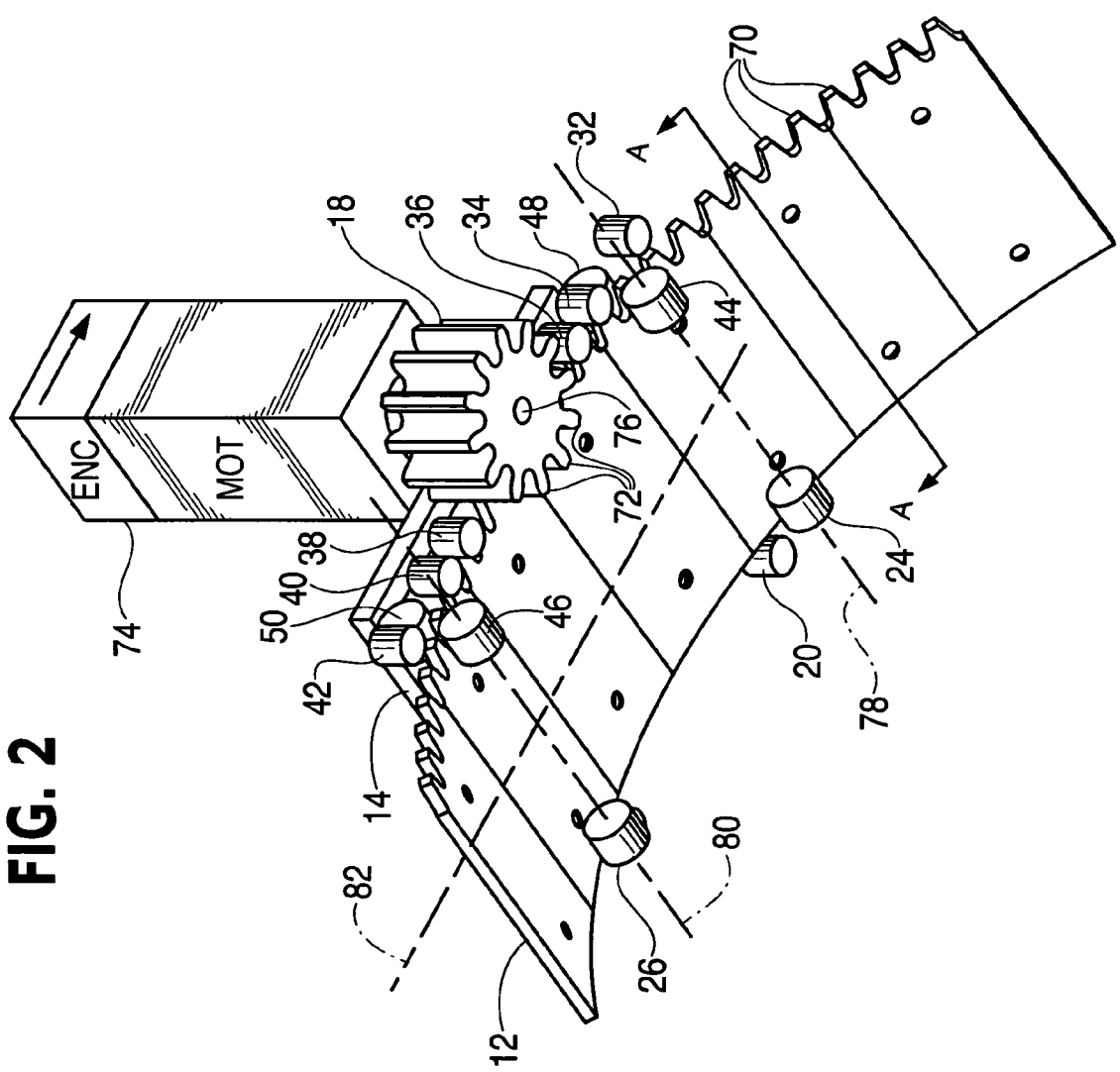
FIG. 2 is a second perspective view of the rail system in FIG. 1.

FIG. 2 further illustrates the proximal side constraint components of an exemplary embodiment. Such constraint components may comprise forward proximal transverse rollers 32, 34, and 36, respectively, and aft proximal transverse rollers 38, 40, and 42, respectively, a forward bottom proximal thickness axis roller 44, an aft bottom proximal thickness axis roller 46, a forward top proximal thickness axis roller 48, and an aft top proximal thickness axis roller 50.

FIG. 3 shows a short section of rail 52 with a gear profile 54. The gear profile 54, as cut for example by a conventional gear hob, may preferably have the form of an involute, so that substantially rolling contact can be made with the pinion 18 in FIGS. 1 and 2, which form of contact may in some embodiments reduce wear compared to the degree of wear that would be achieved using sliding contact between a rack and a pinion. The end of each rack tooth in an involute-profile rack is characteristically flat 56, which provides a contact surface for the proximal transverse rollers 32, 34, 36, 38, 40, and 42 in FIG. 2. The extent of the flat 56 determines the number of transverse rollers required. In the example shown, the flat 56 is around ⅓ of the length of the rack tooth interval 58, so three forward rollers 32, 34, and 36 in FIG. 2 are sufficient to assure that at least one is in contact at all times. In an alternate configuration wherein less that ⅓ but at least ¼ of the interval 58 is flat, addition of a fourth roller may be preferred. Taken to the opposite limit, tooth stubbing is not sufficient to reduce the number of rollers for continuous contact with involute gear profiles to two, although alternate gear profiles may permit the number to be so reduced. As will be shown, alternate roller configurations can further reduce this number.

FIG. 4 shows different inner and outer rail radii 60 and 62 of curvature across the thickness 64 of the rail 52, which difference is an effect of curving the rail 52 to conform to the surface of a workpiece 202. The difference in the resulting tooth pitches 66 and 68, exaggerated in FIG. 4, represents an error term in positioning of the toolhead, but can be expected to be near zero for curvatures common on aircraft surfaces. It may be observed in FIG. 3 that the error is noncumulative—that is, the centerline length of the flexed rail remains at or very near the nominal pitch.

Returning to FIG. 2, the drive pinion 18 may be positioned to mesh substantially fully with the rack teeth 70 through the greater portion of the contact arc between each rack tooth 70 and each pinion tooth 72. Since properly meshed involute gear pairs, such as the rack and pinion of the exemplary embodiment, transmit uniform rotary motion, a condition of continuous mesh can allow pinion 18 angular change to be linearly proportional to position of the toolhead 14 along the rail 12. This allows an angle transducer, such as an absolute rotary encoder 74, to detect pinion shaft 76 angle directly and to interpret the value so detected as a unique tool head 14 position. Alternate position detection apparatus, such as incremental rotary encoders, laser rangefinders, acoustic transducers, and others, may be preferable in some embodiments.

From the foregoing it can be appreciated that the rotational axis of the pinion shaft in the exemplary embodiment may be generally perpendicular to the mean surface plane of the workpiece, which rotational axis may be approximately parallel to a thickness axis through the rail.

Multiple rollers placed on the toolhead may in some embodiments allow contact between the toolhead 14 (Shown in FIG. 1) and the rail 12 to be effectively continuous despite the cutting away of as much as or more than two-thirds of a rail 12 edge to provide rack teeth 70.

Separating thickness-axis toolhead-to-rail containment from transverse containment using a square rail edge and separate thickness-axis and transverse rollers can allow the toolhead to follow the rail with minimal position error as the rail curves and twists over a workpiece surface. This flexible track rail and toolhead containment system can provide robust and precisely measurable positioning of the toolhead while permitting the use of a simpler rail than some previous designs, which simpler rail may be less resource intensive to fabricate.

The rail 12 in FIG. 2 is shown with a single axis of curvature parallel to the transverse axis and perpendicular to the thickness axis of the rail 12. This rail 12 curvature can be formed as a result of attaching the rail 12 to a workpiece with a similar curvature. Where the axis of curvature of the workpiece 202 surface is at an oblique angle to the transverse axis of the rail 12, the rail 12 can exhibit twist. This twist may require the axis 78 associated with the lower thickness axis confinement rollers 24 and 44, and the axis 80 associated with the lower thickness axis confinement rollers 22 and 46, to be skewed. This in turn may require that at least one of the axes 78 and 80 be articulated with respect to the toolhead 14. An example of a pivot axis 82 that can provide this articulation is shown in FIG. 2.

FIG. 5 is a section through the rail 12 at A—A in FIG. 2. Rail 12 flexure can cause the effective thickness axis spacing between the upper thickness axis rollers 28 and 48 and the lower thickness axis rollers 24 and 44 to increase from a minimum, which may in some embodiments occur when the rail 12 is flat, to a maximum limited by a system-level specification for workpiece 202 compliance. Since the toolhead 14 position and angular orientation for drilling and other manufacturing operations are defined with respect to the workpiece 202 surface, it is desirable that the rollers 24 and 44 follow the rail 12 closely, with, for example, the contact points of the forward workpiece-side rollers 24 and 44 serving as first and second reference points, and the midpoint between the contact points of the aft workpiece-side rollers 26 and 46 (see FIG. 2) serving as a third reference point. A plane so defined can be employed as a reference for drilling. The toolhead-side rollers 28, 30, 48, and 50 (see FIG. 1), pressed against the workpiece-side rollers 24, 26, 44, and 46 with sufficient force, can effectively minimize displacement error.

The thickness of rail 12 may be dictated by strength and flexibility requirements. A relatively thin rail 12 may be generally desirable to ease conformance to the curvature of a workpiece, while a relatively thick rail 12 may be desirable to assure a rigid platform for toolhead 14 operations.

FIG. 5, as previously noted, is a section A—A through a rail 12 similar to that of FIG. 1, showing the relative placement of the forward thickness axis containment rollers 24, 44, 28, and 48 and the forwardmost transverse containment rollers 20 and 32. Alternative arrangements are possible, as indicated in FIGS. 6–8.

FIG. 6 is a section showing a variation on FIG. 5 in which the proximal rack edge 84 is not used for roller contact, but instead the rack edge is relieved 86 to provide bearing surfaces for rollers 88 entirely inboard from the rack 90.

Figure 7:
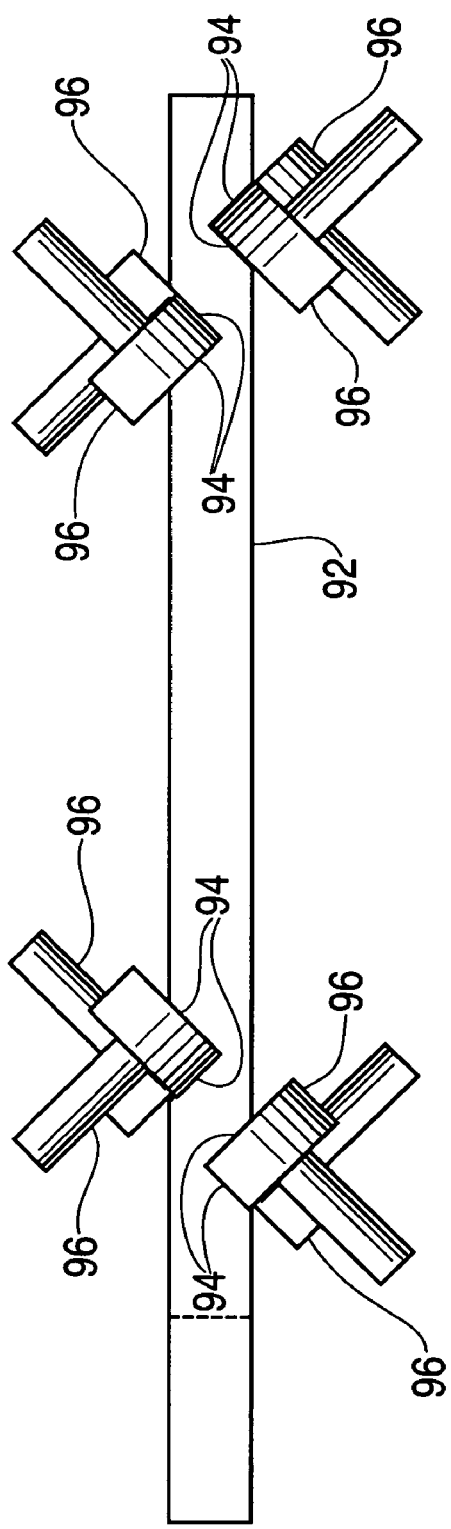
FIG. 7 is a second alternate embodiment rail and roller section view akin to that of A—A from FIG. 2.

FIG. 7 is a section through an alternative rail 92 embodiment with vee grooves 94 in the toolhead-side and workpiece-side surfaces, against which grooves rollers 96 can bear to carry the weight of the toolhead 14 and to define thickness axis and transverse positioning of the toolhead 14 with respect to the rail 92. In this embodiment, two flat rollers 96 above the rail 92 and two more below near each corner of the toolhead 14 couple the toolhead 14 to the rail 92.

Figure 8:
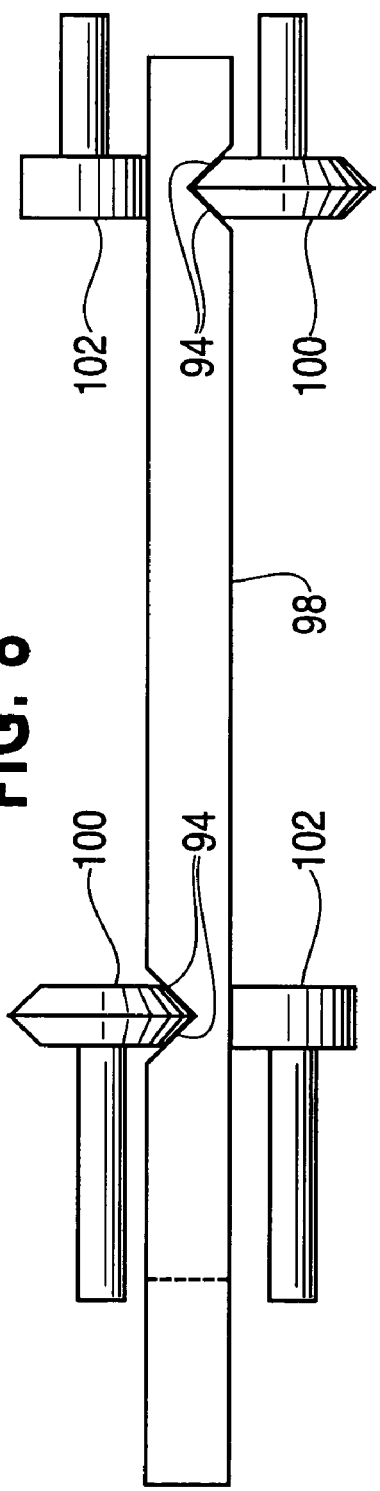
FIG. 8 is a third alternate embodiment rail and roller section view akin to that of A—A from FIG. 2.

FIG. 8 is a section through a rail 98 similar to that of FIG. 7, equipped with two vee-rimmed rollers 100 to provide lateral confinement, and two flat-rimmed rollers 102 to balance pressure.

All of the rail embodiments shown in FIGS. 5–8 may be capable of providing side rack coupling to a rail-mounted toolhead 14. FIG. 5 may be preferable, for example, for supporting a comparatively thin rail section, while the embodiments of FIGS. 6–8 may each prove preferable in some applications. Other embodiments are likewise possible.

Figure 9:
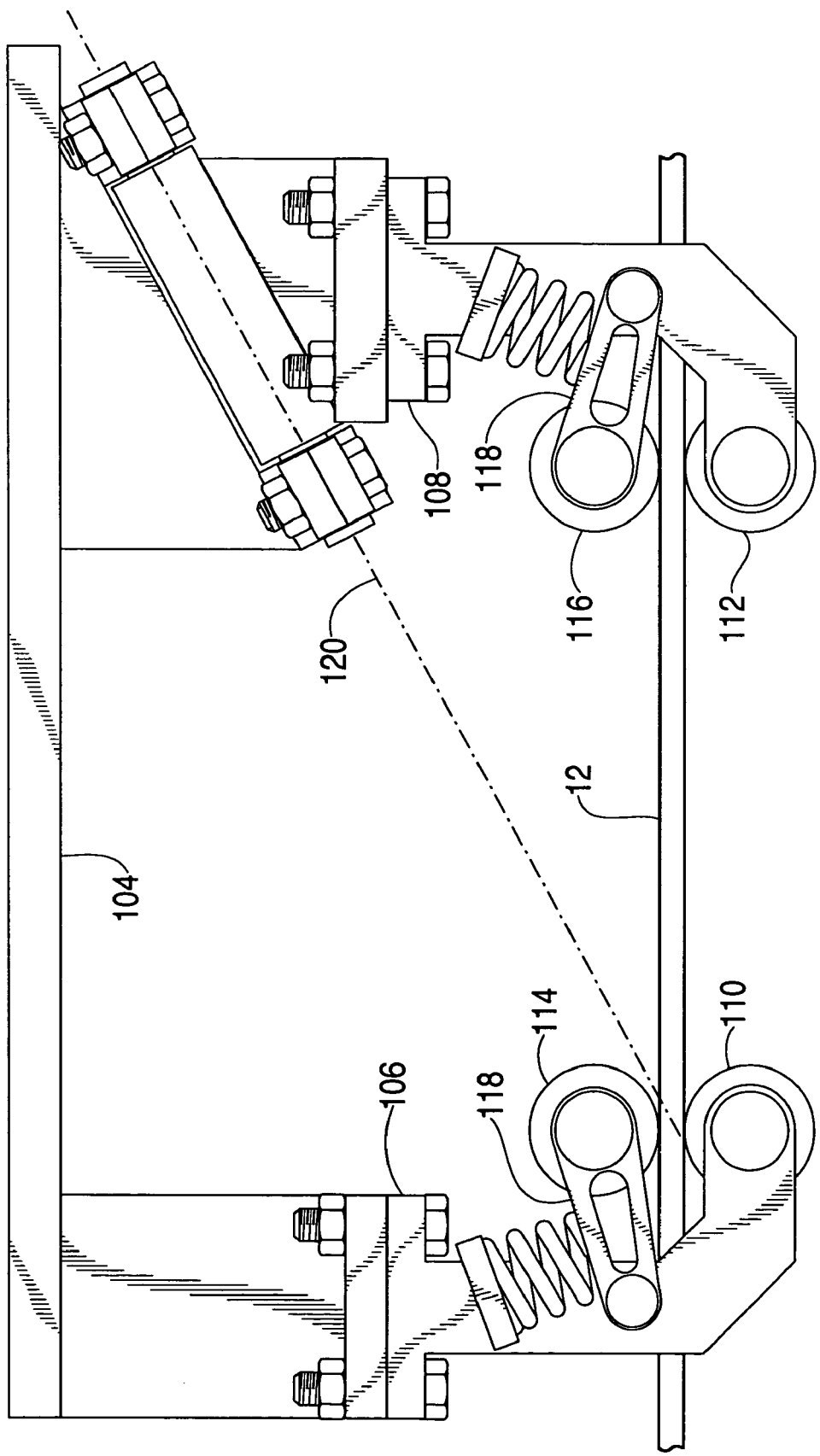
FIG. 9 is a side view of a vertical containment apparatus according to an embodiment of the invention.

FIG. 9 is a side view of a simplified cart 104 that permits the axes bearing the forward and aft vertical confinement rollers of an embodiment similar to that of FIG. 5 to skew. In FIG. 9, a rigidly attached truck 106 and a pivotable truck 108 carry lower thickness axis confinement rollers 110 and 112, respectively. Upper thickness axis confinement rollers 114 and 116, respectively, on independent arms 118, are spring-loaded to bear against the lower thickness axis confinement rollers 110 and 112. The pivot axis 120 as shown passes approximately through the center of the rail 12 at the nominal rail 12 contact line with the lower thickness axis confinement rollers 110 on the rigidly attached truck 106. The transverse axis confinement apparatus is omitted for clarity.

In some systems, it may be preferred to constrain the rollers 110, 112, 114, and 116 of FIG. 9 to lie in a substantially fixed plane and to tolerate some residual stress. Such an accommodation may significantly reduce truck complexity, weight, and height, for example.

Figure 10:
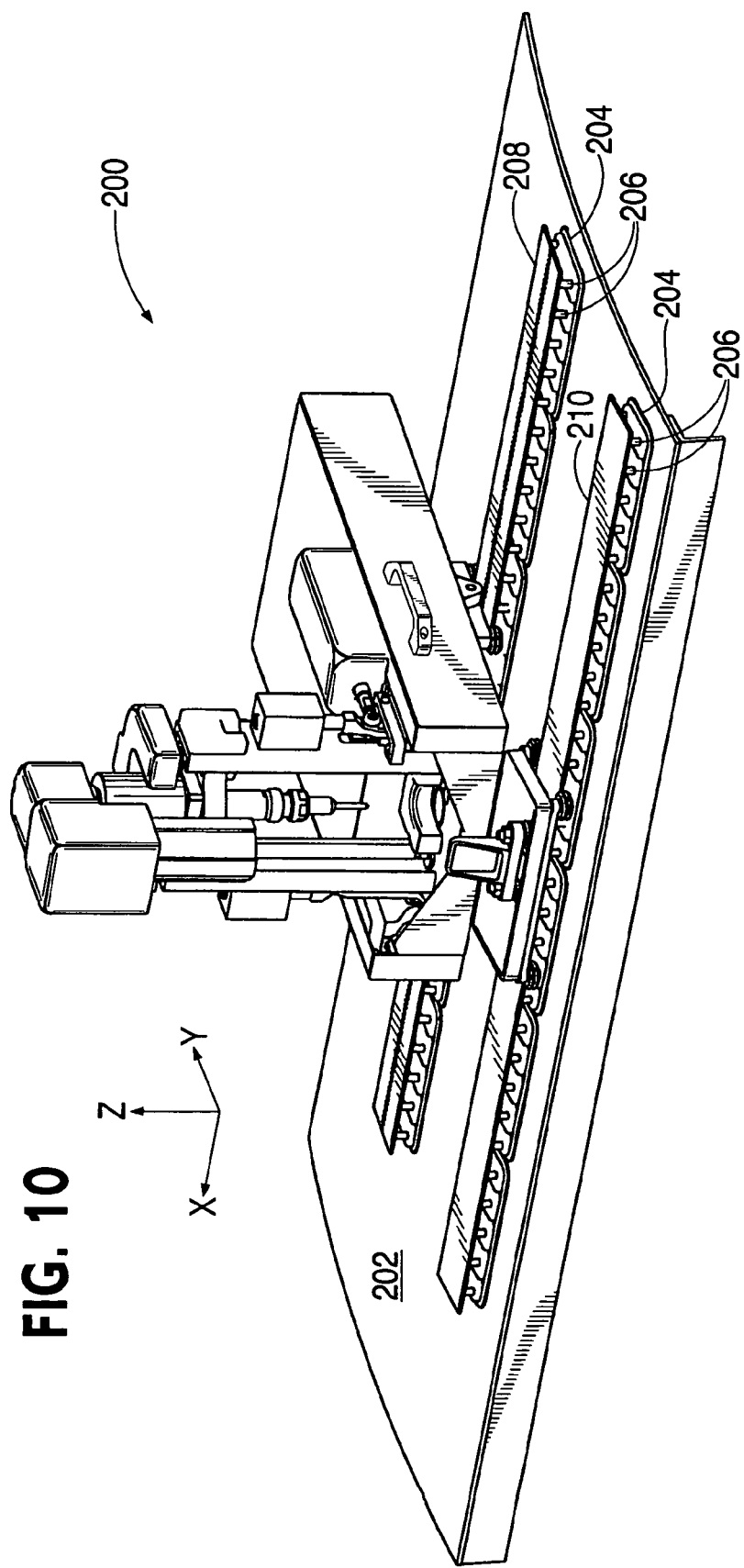
FIG. 10 is a perspective view of a toolhead positioned on rails and attached to a workpiece.

FIG. 10 shows a generic toolhead 200 attached to a workpiece 202 by vacuum cups 204. The vacuum cups 204 employ a plurality of standoff devices or spacers 206 to position a main rail 208 and an auxiliary rail 210 at uniform distances above the workpiece 202. FIG. 10 further illustrates reference axes X (longitudinal), Y (transverse) and Z (thickness) applicable both to the generic toolhead 200 and to the side rack rail system 10 herein disclosed.

A side rack rail system 10 (see FIG. 1), like the rails 208 and 210 and the drive mechanism embedded in the toolhead 200 in FIG. 10, may be attached by vacuum cups 204 or another apparatus to a workpiece 202 and used as a retention and positioning system for a toolhead 14. This represents one possible application of the inventive apparatus disclosed herein. Rigid standoff devices or spacers 206 may be embedded in the vacuum cups 204 and secured to a side rack rail 12 as the spacers 206 are to the rails 208 and 210 in the generic system of FIG. 10. Vacuum cups 204 may then be urged against the workpiece 202 by ambient air pressure to establish rail 208 and 210 compliance to workpiece 202 curvature.

The material from which a rail 12 according to a preferred embodiment is fabricated may be metal or another substance, provided the material exhibits sufficient durability and limberness to conform repeatedly to the shape of a succession of workpiece 202 surfaces and to tolerate recurring longitudinal-axis stresses on the rack teeth 70 incised therein. Preferable materials may exhibit proportionality between stiffness and elasticity, which proportionality may permit a rail to assume a generally uniform curve between the attachment points of a succession of spacers that establish the distance between the rail 12 and the workpiece 202 to which the rail 12 is temporarily attached. Rail 12 materials with other combinations of mechanical properties, such as tolerance of temperature extremes or chemical attack, may be preferred for some applications.

It will be appreciated that a side rack rail 12, used either with multiple rollers riding on the proximal rail edge or with grooves to allow the rollers to be fitted inboard of the rack, can be used for applications other than aircraft manufacturing. Such applications may include other types of sheet product assembly, such as automobile, building, and highway construction, operations other than drilling, such as welding, measuring, and cutting, micro- and nano-operations, such as miniature electronics fabrication and medical procedures, robotic operations in hazardous environments, and many others.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to that fall within the scope of the invention.

What is claimed is:

1. A flexible track tool system to perform operations on a surface of a workpiece that has a mean planar first surface proximal to the tool system, wherein the tool system comprises:
    a resilient, flexible rail with generally parallel upper and lower surfaces, and with a longitudinal axis, a transverse axis, and a thickness axis;
    a first longitudinal rail edge generally parallel to the longitudinal axis;
    a second longitudinal rail edge generally parallel to the longitudinal axis;
    a plurality of standoff devices to position said rail at a substantially uniform and surface-contour-following distance above the workpiece, with the thickness axis substantially perpendicular to the first surface of the workpiece;
    a toolhead positioned on said rail;
    a set of toolhead-to-rail retention devices that permit said toolhead to translate longitudinally with respect to said rail;
    a gear tooth rack formed into said second longitudinal rail edge, the gear tooth rack including a plurality of rack gear teeth and a pitch, each rack gear tooth having a tooth profile and a centerline, the tooth profile including a top land, flank, and bottom land, the top land being distal to the longitudinal axis relative to the bottom land, the centerline being perpendicular to the longitudinal axis and passing through a center of the top land, the pitch being a length from the centerline of a rack gear tooth to the centerline of an adjacent rack gear tooth, the top land including an essentially flat portion having a top land length and top land width, the top land length being generally parallel to the longitudinal axis, the top land width being generally parallel to the thickness axis, the top land length being about ⅓ the pitch;
    a set of transverse rollers to constrain the toolhead along the transverse axis, the set of transverse rollers including three rollers, each roller being disposed a multiple of ⅓ the pitch, wherein at least one of the set of rollers is in contact with the top land of a rack gear tooth at all positions along the gear tooth rack; and
    a drive pinion rotatably attached to said toolhead, to mesh with said gear tooth rack.

2. The flexible track tool system of claim 1, wherein said rail further comprises:
    a first longitudinal edge that is continuous; and
    a second longitudinal edge that is segmented, which said second edge comprises a succession of individually continuous segments separated by substantially uniformly distributed gear teeth.

3. The flexible track tool system of claim 2, wherein said set of toolhead-to-rail retention devices further comprises:
    a first thickness-axis plurality of rollers that constrain motion of said toolhead toward and away from the workpiece with respect to said first longitudinal rail edge; and
    a second thickness-axis plurality of rollers that constrain motion of said toolhead toward and away from the workpiece with respect to said second longitudinal rail edge.

4. The flexible track tool system of claim 2, wherein said set of toolhead-to-rail retention devices further comprises:

a first transverse plurality of rollers that constrain said toolhead in the transverse axis of said rail with respect to said first longitudinal rail edge.

5. The flexible track tool system of claim 1, wherein said standoff devices further comprise:
   a plurality of rigid standoff fittings of uniform length rigidly attached to said rail and oriented parallel to the thickness axis of said rail; and
   a plurality of rail-to-workpiece attachment devices to removably attach said standoff fittings to the workpiece.

6. The flexible track tool system of claim 1, wherein said standoff devices are placed at uniform intervals on said rail.

7. The flexible track tool system of claim 1, wherein said toolhead further comprises:
   a drive mechanism to perform at least one of position, detect, and immobilize said toolhead with respect to said rail.

8. The flexible track tool system of claim 1, wherein the flank of each rack gear tooth includes a curved planar surface from the top land to the bottom, the flank being curved relative to the longitudinal axis and essentially straight relative to the thickness axis.

9. The flexible track tool system of claim 8, wherein each of said rack gear teeth meshes sequentially with a tooth of said drive pinion as said drive pinion advances while rotating about an axis that advances parallel to said second longitudinal rail edge.

10. The flexible track tool system of claim 8, wherein said rack gear teeth are stubbed.

11. The flexible track tool system of claim 8, wherein said gear tooth rack comprises:
   a center of flexure of said rail that is located on a plane within said rail at which plane a least dimension change occurs as a result of rail flexure, wherein said plane is generally parallel to said upper and lower surfaces of said rail; and
   a set of rack gear teeth arrayed along said second longitudinal rail edge, wherein a tooth profile of said set of teeth is relieved above and below said center of flexure of said rail, wherein said profile varies substantially smoothly in the thickness direction, and wherein a tightest fit of said rack teeth with respect to a straight-cut pinion generally coincides with said center of flexure of said rail.

12. The flexible track tool system of claim 1, wherein said gear tooth rack and said drive pinion have involute gear forms.

13. The flexible track tool system of claim 1, wherein said drive pinion comprises:
   a straight-cut gear that rotates about an axis generally parallel to said second longitudinal edge of said rail, wherein said axis is positioned beyond said second longitudinal rail edge, and wherein said straight-cut gear has a tooth profile that meshes with a gear tooth rack;
   a preceding pinion gear tooth;
   a succeeding pinion gear tooth;
   a preceding rack tooth; and
   a succeeding rack tooth, wherein said succeeding pinion tooth acquires contact with a succeeding rack tooth before said preceding pinion tooth loses contact with a preceding rack tooth.

14. The flexible track tool system of claim 1, wherein said drive pinion comprises a curved-cut gear with teeth that are at oriented least substantially parallel to the axis of rotation of said gear, wherein said gear rotates about an axis that is generally parallel said second longitudinal edge of said rail, wherein said axis is positioned beyond said second longitudinal rail edge, wherein said curved-cut gear has a tooth profile that meshes with a rack, and wherein said curved-cut gear has a largest diameter that occurs at least near a plane of contact between said curved-cut gear and said rack when said rail has substantially no thickness-axis curvature.

15. The flexible track tool system of claim 1, wherein said drive pinion further comprises a gear made from resilient material.

16. The flexible track tool system of claim 1, further comprising:
   a continuous step that has a reduction in rail thickness along at least a part of the length of said rail; and
   a bearing device attached to said toolhead that is in contact with said continuous step.

17. The flexible track tool system of claim 1, wherein said set of toolhead-to-rail retention devices comprises at least one block of nonrotating bearing material attached to said toolhead to prevent relative motion between said rail and said toolhead in at least one direction of upward, downward, and transverse, without inhibition of longitudinal motion.

18. A flexible track tool system to perform operations on a surface of a workpiece that has a mean planar first surface proximal to the tool system, wherein the tool system comprises:
   a rail;
   means for supporting a tool on said rail;
   means for continuously positioning said tool supporting means on said rail with generally parallel upper and lower positioning surfaces above a proximal workpiece surface, wherein said means for positioning has a longitudinal axis, a transverse axis, and a thickness axis;
   means for limiting transverse motion of a tool supporting means on a rail with a first longitudinal edge and a second longitudinal edge substantially parallel to said longitudinal axis;
   means for connecting the rail to the workpiece at a distributed series of locations and at a uniform distance;
   means for permitting longitudinal translation of the tool supporting means to substantially any position along the extent of the rail while preventing thickness axis or transverse displacement of the tool supporting means with respect to the mean planar first surface of the workpiece; and
   means for providing traction on the rail with respect to the tool supporting means the means for providing traction including a plurality of rack gear teeth comprising a rack, wherein the rack gear teeth interrupt a longitudinal edge of the rail, each rack gear tooth having a tooth profile and a centerline, the tooth profile including a top land, flank, and bottom land, the top land being distal to the longitudinal axis relative to the bottom land, the centerline being perpendicular to the longitudinal axis and passing through a center of the top land, the pitch being a length from the centerline of a rack gear tooth to the centerline of an adjacent rack gear tooth, the top land including an essentially flat portion having a top land length and top land width, the top land length being generally parallel to the longitudinal axis, the top land width being generally parallel to the thickness axis, the top land length being about ⅓ the pitch;
   means preventing transverse displacement with a set of transverse rollers to constrain the toolhead along the transverse axis, the set of transverse rollers including three rollers, each roller being disposed a multiple of ⅓ the pitch, wherein at least one of the set of rollers is in contact with the top land of a rack gear tooth at all positions along the gear tooth rack.

19. The flexible track tool system of claim 18, wherein said means for positioning further comprises:
   means for applying longitudinal translational force from the tool supporting means to said means for providing traction.

20. The flexible track tool system of claim 18, wherein said means for positioning further comprises:
   means for applying longitudinal translational force from the tool supporting means to said means for providing traction by a rotating tractive means with an axis of rotation of the rotating tractive means that is substantially perpendicular to the mean planar first surface of the workpiece.

21. The flexible track tool system of claim 18, wherein said means for positioning further comprises:
   first means for limiting transverse positional displacement along a first continuous edge of the rail; and
   second means for limiting transverse positional displacement along a second edge of the rail, wherein the second edge has a succession of individually continuous segments separated by uniformly distributed gear tooth openings, and wherein the gear tooth openings are curved relative to the longitudinal axis and straight relative to the transverse axis.

22. A method for performing tool operations on a workpiece that has a mean planar first proximal surface, wherein the steps of the tool operation performance method comprise:
   continuously positioning a toolhead above a proximal workpiece surface with a rail, wherein the rail has a longitudinal axis, a transverse axis, and a thickness axis, with generally parallel upper and lower positioning surfaces, and with a first longitudinal edge and a second longitudinal edge substantially parallel to the longitudinal axis, wherein the thickness axis is substantially perpendicular to the first surface of the workpiece;
   connecting the rail to the workpiece at a distributed series of locations and at a uniform distance;
   permitting longitudinal translation of the toolhead to substantially any position along the extent of the rail while substantially preventing thickness axis or transverse displacement of the toolhead;
   providing traction on the rail with respect to the toolhead with a plurality of rack gear teeth comprising a rack, wherein the rack grear teeth interrupt the second longitudinal edge of the rail, each rack gear tooth having a tooth profile and a centerline, the tooth profile including a top land, flank, and bottom land, the top land being distal to the longitudinal axis relative to the bottom land, the centerline being perpendicular to the longitudinal axis and passing through a center of the top land, the pitch being a length from the centerline of a rack gear tooth to the centerline of an adjacent rack gear tooth, the top land including an essentially flat portion having a top land length and top land width, the top land length being generally parallel to the longitudinal axis, the top land width being generally parallel to the thickness axis, the top land length being about ⅓ the pitch:
   providing transverse displacement prevention with a set of transverse rollers to constrain the toolhead along the transverse axis, the set of transverse rollers including three rollers, each roller being disposed a multiple of ⅓ the pitch, wherein at least one of the set of rollers is in contact with the top land of a rack gear tooth at all positions along the gear tooth rack; and
   applying longitudinal translational force from the toolhead by a pinion gear with an axis of rotation substantially perpendicular to the workpiece.

23. The method for performing tool operations on a workpiece of claim 22, wherein the positioning of a toolhead further comprises:
   limiting positional displacement with respect to a continuous edge of the rail with a first set of rollers, where the shafts of the first set of rollers are generally perpendicular to the mean plane of the workpiece;
   limiting positional displacement with respect to a continuous edge of the rail with a second set of rollers, where the shafts of the second set of rollers are generally parallel to the mean plane of the workpiece and perpendicular to the longitudinal axis of the rail in the vicinity of the rollers;
   limiting positional displacement with respect to a segmented edge of the rail with the first set of rollers, where the number and placement of the first set of rollers permits continuous bearing between the toolhead and at least one segment of the segmented edge; and
   limiting positional displacement with respect to a segmented edge of the rail with the second set of rollers, where the second set of rollers is set back sufficiently from the segmented edge of the rail to permit continuous contact between the rollers and the rail.

* * * * *

UNITED STATES PATENT AND TRADEMARK OFFICE
CERTIFICATE OF CORRECTION

| | |
|---|---|
| PATENT NO. | : 7,185,407 B2 |
| APPLICATION NO. | : 10/854211 |
| DATED | : March 6, 2007 |
| INVENTOR(S) | : Theodore M. Boyl-Davis et al. |

It is certified that error appears in the above-identified patent and that said Letters Patent is hereby corrected as shown below:

<u>Column 10</u>
Line 48, please replace "supporting means" with --supporting means,--;

<u>Column 11</u>
Line 49, please replace "grear" with --gear--.

Signed and Sealed this

First Day of May, 2007

JON W. DUDAS
*Director of the United States Patent and Trademark Office*